United States Patent
Stephan et al.

(10) Patent No.: US 11,990,862 B2
(45) Date of Patent: May 21, 2024

(54) RAIL ACCESSORY MOUNT

(71) Applicant: PEGASUS SOLAR INC., Richmond, CA (US)

(72) Inventors: Erich Kai Stephan, Richmond, CA (US); Peter Wilke, Richmond, CA (US); Nicholas Wenzel, Richmond, CA (US); James Hsieh, Richmond, CA (US)

(73) Assignee: PEGASUS SOLAR INC., Richmond, CA (US)

( * ) Notice: Subject to any disclaimer, the term of this patent is extended or adjusted under 35 U.S.C. 154(b) by 38 days.

(21) Appl. No.: 17/672,567

(22) Filed: Feb. 15, 2022

(65) Prior Publication Data

US 2022/0263458 A1   Aug. 18, 2022

Related U.S. Application Data

(60) Provisional application No. 63/151,008, filed on Feb. 18, 2021.

(51) Int. Cl.
   *H02S 30/00*   (2014.01)
   *F16B 5/12*   (2006.01)

(52) U.S. Cl.
   CPC .............. *H02S 30/00* (2013.01); *F16B 5/123* (2013.01)

(58) Field of Classification Search
   CPC .................................. H02S 30/00; F16B 5/123
   See application file for complete search history.

(56) References Cited

U.S. PATENT DOCUMENTS

| | | | | |
|---|---|---|---|---|
| 2,394,729 A | * | 2/1946 | Tinnerman | F16B 37/044 411/970 |
| 2,712,917 A | * | 7/1955 | Flora | F16B 5/0685 248/300 |
| 3,066,900 A | * | 12/1962 | Holton | F16L 3/04 24/339 |
| 3,122,604 A | | 2/1964 | Cook et al. | |
| 3,145,753 A | * | 8/1964 | Kreider | F16B 37/041 411/970 |
| 3,966,342 A | | 6/1976 | Moriya | |
| 4,159,758 A | | 7/1979 | Courson | |
| 4,269,043 A | | 5/1981 | Kizu et al. | |
| 4,285,379 A | | 8/1981 | Kowalski | |
| 4,570,408 A | | 2/1986 | Frascaroli et al. | |

(Continued)

FOREIGN PATENT DOCUMENTS

| | | |
|---|---|---|
| AU | 2020287090 | 11/2021 |
| AU | 2020336321 | 1/2022 |

(Continued)

OTHER PUBLICATIONS

PCT Application No. PCT/US2020/035874, International Preliminary Report on Patentability dated Dec. 7, 2021.

(Continued)

*Primary Examiner* — Anita M King
(74) *Attorney, Agent, or Firm* — Polsinelli

(57) ABSTRACT

A u-shaped clamp that includes offset bends at distal ends, accepts a threaded fastener through two apertures, where tightening the fastener brings two flanges of the u-shaped clamp together to grip a wire, a cable or a pipe. An offset bend on one end of one flange serves to hold a wire or cable in position until the fastener is tightened.

15 Claims, 7 Drawing Sheets

(56) References Cited

U.S. PATENT DOCUMENTS

| | | | |
|---|---|---|---|
| 4,729,706 A * | 3/1988 | Peterson | F16B 37/02 |
| | | | D8/395 |
| 4,897,005 A * | 1/1990 | Peterson | F16B 37/02 |
| | | | 411/174 |
| 4,907,388 A | 3/1990 | Siahatgar | |
| 4,950,841 A | 8/1990 | Walker et al. | |
| 5,144,780 A | 9/1992 | Gieling et al. | |
| 5,203,135 A | 4/1993 | Bastian | |
| D353,209 S | 12/1994 | Dallaire et al. | |
| 5,423,646 A * | 6/1995 | Gagnon | F16B 37/041 |
| | | | 411/184 |
| 5,489,173 A | 2/1996 | Hofle | |
| 5,596,237 A * | 1/1997 | Daniels | H02K 11/40 |
| | | | 310/71 |
| 5,657,604 A | 8/1997 | Malott | |
| 5,713,707 A * | 2/1998 | Gagnon | F16B 37/041 |
| | | | 411/524 |
| 6,205,719 B1 | 3/2001 | Bruce | |
| 6,568,873 B1 | 5/2003 | Peterson | |
| 6,874,971 B2 | 4/2005 | Albaugh | |
| 7,077,855 B2 | 7/2006 | Curtis | |
| 7,568,855 B2 * | 8/2009 | Fitzler | F16B 21/183 |
| | | | 411/522 |
| 7,832,180 B2 | 11/2010 | Dolby | |
| 7,866,098 B2 | 1/2011 | Cinnamon | |
| 7,878,745 B2 * | 2/2011 | Allen | F16B 27/00 |
| | | | 206/338 |
| 8,375,661 B1 | 2/2013 | diGirolamo et al. | |
| 8,387,319 B1 | 3/2013 | Gilles-Gagnon et al. | |
| 8,567,030 B2 | 10/2013 | Koch et al. | |
| 8,656,658 B2 | 2/2014 | Shufflebotham | |
| 8,695,290 B1 | 4/2014 | Kim et al. | |
| 8,893,445 B2 | 11/2014 | Yen | |
| 8,919,075 B2 | 12/2014 | Erickson | |
| 8,935,893 B2 | 1/2015 | Liu et al. | |
| 8,938,932 B1 | 1/2015 | Wentworth et al. | |
| D732,698 S | 6/2015 | Meng | |
| 9,121,433 B1 | 9/2015 | Bacon | |
| 9,181,705 B2 | 11/2015 | Lanza | |
| 9,249,813 B2 | 2/2016 | Kalman | |
| 9,267,529 B2 * | 2/2016 | Tejero Salinero | F16B 37/041 |
| 9,350,288 B2 | 5/2016 | Hardikar | |
| 9,447,988 B2 | 9/2016 | Steams et al. | |
| 9,473,066 B2 | 10/2016 | Stephan et al. | |
| 9,531,319 B2 | 12/2016 | Braunstein et al. | |
| 9,590,405 B1 | 3/2017 | Maurer | |
| 9,590,406 B1 | 3/2017 | Maurer | |
| 9,705,299 B1 | 3/2017 | Maurer et al. | |
| 9,660,570 B2 * | 5/2017 | Stephan | F16B 5/0028 |
| 9,689,411 B2 | 6/2017 | Meine et al. | |
| 9,819,303 B2 | 11/2017 | Ash | |
| 9,837,954 B2 | 12/2017 | Ash | |
| 9,893,677 B1 | 2/2018 | Liu | |
| 10,097,133 B2 | 10/2018 | Aliabadi et al. | |
| 10,205,418 B2 | 2/2019 | Nayar | |
| 10,211,775 B1 | 2/2019 | Wentworth et al. | |
| 10,218,305 B1 | 2/2019 | Schrock | |
| 10,270,383 B2 | 4/2019 | Wildes et al. | |
| 10,288,319 B2 | 5/2019 | Li et al. | |
| 10,305,415 B2 | 5/2019 | McPheeters et al. | |
| 10,472,828 B2 | 11/2019 | Stearns et al. | |
| 10,749,459 B1 | 8/2020 | Liu et al. | |
| 10,847,960 B1 * | 11/2020 | Naugler | H01R 4/64 |
| 10,914,513 B1 | 2/2021 | Dhage et al. | |
| 11,143,436 B1 | 10/2021 | Stephan et al. | |
| 11,296,648 B1 | 4/2022 | Jasmin et al. | |
| 11,313,591 B1 | 4/2022 | Atia | |
| 11,336,222 B1 | 5/2022 | Garza et al. | |
| 11,463,040 B2 | 10/2022 | Affentranger, Jr. | |
| 11,486,434 B2 | 11/2022 | Kovacs et al. | |
| D1,004,141 S | 11/2023 | Stephan et al. | |
| 11,811,358 B2 * | 11/2023 | Von Deylen | H02S 30/10 |
| 2007/0248434 A1 | 10/2007 | Wiley et al. | |
| 2008/0310913 A1 | 12/2008 | Urban et al. | |
| 2009/0003961 A1 * | 1/2009 | Benkel | F16B 37/043 |
| | | | 411/366.1 |
| 2009/0114269 A1 | 5/2009 | Fletcher et al. | |
| 2010/0202853 A1 | 8/2010 | Merhar et al. | |
| 2010/0281793 A1 | 11/2010 | McPheeters et al. | |
| 2011/0001030 A1 | 1/2011 | Hochreiter et al. | |
| 2011/0194886 A1 | 8/2011 | Wu et al. | |
| 2011/0240101 A1 | 10/2011 | Sagayama et al. | |
| 2011/0253859 A1 | 10/2011 | Ostermeier et al. | |
| 2012/0097207 A1 | 4/2012 | Shufflebotham et al. | |
| 2013/0121760 A1 | 5/2013 | Chen et al. | |
| 2013/0200234 A1 | 8/2013 | Zhao et al. | |
| 2013/0247485 A1 | 9/2013 | Zimmerman et al. | |
| 2013/0291479 A1 | 11/2013 | Schaefer et al. | |
| 2014/0000681 A1 | 1/2014 | Zhao et al. | |
| 2014/0014163 A1 | 1/2014 | McCarthy et al. | |
| 2014/0026946 A1 | 1/2014 | West et al. | |
| 2014/0042286 A1 | 2/2014 | Jaffari | |
| 2014/0079510 A1 | 3/2014 | Suzuki et al. | |
| 2014/0102517 A1 | 4/2014 | Meine et al. | |
| 2014/0154908 A1 | 6/2014 | Magno et al. | |
| 2014/0165499 A1 | 6/2014 | Vanker et al. | |
| 2014/0220834 A1 | 8/2014 | Rizzo | |
| 2014/0353435 A1 | 12/2014 | Liu et al. | |
| 2015/0101997 A1 | 4/2015 | Liu et al. | |
| 2015/0102194 A1 | 4/2015 | Liu | |
| 2015/0180404 A1 | 6/2015 | Braunstein et al. | |
| 2015/0226246 A1 | 8/2015 | Kirchner | |
| 2015/0311606 A1 | 10/2015 | Meine et al. | |
| 2015/0316086 A1 | 11/2015 | Urban et al. | |
| 2015/0357773 A1 | 12/2015 | Schirmeier | |
| 2015/0381106 A1 | 12/2015 | Fujikawa et al. | |
| 2016/0006390 A1 | 1/2016 | Cinnamon et al. | |
| 2016/0043687 A1 | 2/2016 | McPheeters et al. | |
| 2016/0069592 A1 | 3/2016 | Giraudo et al. | |
| 2016/0087576 A1 | 3/2016 | Johansen et al. | |
| 2016/0111996 A1 | 4/2016 | Stephan et al. | |
| 2016/0156169 A1 | 6/2016 | Jaena et al. | |
| 2016/0282018 A1 | 6/2016 | Ash et al. | |
| 2016/0248367 A1 | 8/2016 | Almy et al. | |
| 2016/0268958 A1 | 9/2016 | Wildes et al. | |
| 2016/0285408 A1 | 9/2016 | Ash et al. | |
| 2016/0329671 A1 | 11/2016 | Kokenda et al. | |
| 2017/0033730 A1 | 2/2017 | Almy et al. | |
| 2017/0063301 A1 | 3/2017 | Ash | |
| 2017/0133977 A1 | 5/2017 | Tripp et al. | |
| 2017/0146041 A1 | 5/2017 | Schaefer et al. | |
| 2017/0170579 A1 | 6/2017 | Martin | |
| 2017/0201080 A1 | 7/2017 | Maurer et al. | |
| 2017/0233996 A1 | 8/2017 | Abernathy et al. | |
| 2017/0237386 A1 | 8/2017 | Stephan et al. | |
| 2017/0366131 A1 | 12/2017 | Steams et al. | |
| 2018/0062561 A1 | 3/2018 | Kapla et al. | |
| 2018/0076605 A1 | 3/2018 | Garcia | |
| 2018/0091091 A1 | 3/2018 | Rossi | |
| 2018/0094418 A1 | 4/2018 | Winter | |
| 2018/0245331 A1 | 8/2018 | Tang et al. | |
| 2018/0367093 A1 | 12/2018 | Ayers et al. | |
| 2019/0068110 A1 | 2/2019 | McPheeters | |
| 2019/0154306 A1 | 5/2019 | Rothschild | |
| 2019/0178274 A1 | 6/2019 | Katz | |
| 2019/0211543 A1 | 7/2019 | Abernathy et al. | |
| 2019/0326847 A1 | 10/2019 | Zuritis | |
| 2020/0056370 A1 | 2/2020 | Hebiishi et al. | |
| 2020/0389122 A1 | 12/2020 | Stephan | |
| 2020/0403559 A1 | 12/2020 | Kresse et al. | |
| 2021/0067083 A1 | 3/2021 | Stephan | |
| 2021/0156135 A1 | 5/2021 | Stephan et al. | |
| 2021/0156413 A1 | 5/2021 | Stephan | |
| 2021/0194158 A1 | 6/2021 | Ash et al. | |
| 2021/0222421 A1 | 7/2021 | Meine | |
| 2021/0310513 A1 | 10/2021 | Feldmann et al. | |
| 2022/0190781 A1 | 6/2022 | Stephan | |
| 2022/0239247 A1 | 7/2022 | Stephan | |
| 2022/0298776 A1 | 9/2022 | Stephan | |
| 2023/0178904 A1 | 6/2023 | Stephan et al. | |

(56) References Cited

U.S. PATENT DOCUMENTS

2023/0204972 A1 6/2023 Wu et al.
2023/0287674 A1 9/2023 Stephan et al.

FOREIGN PATENT DOCUMENTS

| EA | 008534556-0001 | 10/2021 |
| EP | 2239783 | 10/2010 |
| EP | 8534556 | 5/2021 |
| EP | 20819161.9 | 11/2021 |
| EP | 20857031.7 | 1/2022 |
| EP | 20893136.0 | 3/2022 |
| EP | 3981029 | 4/2022 |
| EP | 20891880.5 | 5/2022 |
| EP | 4022765 | 7/2022 |
| EP | 201921576.1 | 5/2023 |
| HK | 62022063342.9 | 11/2022 |
| HK | 40074229 | 12/2022 |
| HK | 62023069412.2 | 3/2023 |
| HK | 40080613 | 5/2023 |
| MX | MX/f/2021/001551 | 5/2021 |
| MX | 2022/001475 | 2/2022 |
| MX | MX/a/2022/004556 | 4/2022 |
| MX | 64445 | 6/2022 |
| WO | WO 2021/119458 | 6/2017 |
| WO | PCT/US2020/035874 | 6/2020 |
| WO | PCT/US2020/062151 | 11/2020 |
| WO | PCT/US2020/062406 | 11/2020 |
| WO | PCT/US2020/065160 | 12/2020 |
| WO | WO 2020/247463 | 12/2020 |
| WO | PCT/US2021/020708 | 3/2021 |
| WO | WO 2021/041408 | 3/2021 |
| WO | WO 2021/108492 | 6/2021 |
| WO | WO 2021/108696 | 6/2021 |
| WO | WO 2022/132135 | 6/2022 |
| WO | WO 2022/159122 | 7/2022 |
| WO | PCT/US2022/052152 | 12/2022 |
| WO | 2023/107563 | 6/2023 |
| WO | PCT/US2023/030741 | 8/2023 |
| WO | PCT/US2023/036805 | 11/2023 |
| WO | PCT/US2024/014904 | 2/2024 |

OTHER PUBLICATIONS

PCT Application No. PCT/US2020/035874, International Search Report and Written Opinion dated Aug. 18, 2020.
PCT Application No. PCT/US2020/047792, International Preliminary Report on Patentability dated Mar. 1, 2022.
PCT Application No. PCT/US2020/047792, International Search Report and Written Opinion dated Nov. 9, 2020.
PCT Application No. PCT/US2020/065160, International Search Report and Written Opinion dated Apr. 20, 2021.
PCT Application No. PCT/US2020/062151, International Preliminary Report on Patentability dated May 17, 2022.
PCT Application No. PCT/US2020/062151, International Search Report and Written Opinion dated Feb. 17, 2021.
PCT Application No. PCT/US2020/062406, International Preliminary Report on Patentability dated May 17, 2022.
PCT Application No. PCT/US2020/062406, International Search Report and Written Opinion dated Mar. 30, 2021.
PCT Application No. PCT/US2021/020708, International Search Report and Written Opinion dated Jul. 21, 2021.
U.S. Appl. No. 16/889,635, Final Office Action dated Nov. 4, 2022.
U.S. Appl. No. 16/889,635, Office Action dated Sep. 28, 2022.
U.S. Appl. No. 17/001,357, Office Action dated Jun. 3, 2022.
U.S. Appl. No. 17/120,534, Office Action dated May 26, 2021.
U.S. Appl. No. 17/118,771, Final Office Action dated Nov. 7, 2022.
U.S. Appl. No. 17/118,771, Office Action dated Aug. 11, 2022.
U.S. Appl. No. 17/155,624 Office Action dated May 26, 2022.
U.S. Appl. No. 17/834,7744 Office Action dated Nov. 10, 2022.
PCT Application No. PCT/US2022/052152, International Search Report and Written Opinion dated Mar. 28, 2023.
European Patent Office, Application No. 20893136.0, European Search Report dated Aug. 2, 2023, 5 pages.
European Patent Office, Application No. 20819161.9, European Search Report dated Apr. 20, 2023, 8 pages.
U.S. Appl. No. 16/889,635, Office Action dated Mar. 17, 2023.
U.S. Appl. No. 18/109,814 Office Action dated Sep. 14, 2023.
U.S. Appl. No. 17/102,749 Office Action dated Sep. 15, 2023.
PCT Application No. PCT/US2023/030741, International Search Report and Written Opinion dated Jan. 17, 2024.
U.S. Appl. No. 18/435,927, filed Feb. 7, 2024, Erich Kai Stephan.
U.S. Appl. No. 18/386,912, filed Nov. 3, 2023, Erich Kai Stephan.
U.S. Appl. No. 17/118,771, Office Action mailed Feb. 12, 2024.
U.S. Appl. No. 17/102,749 Final Office Action mailed Dec. 29, 2023.

\* cited by examiner

RAIL ACCESSORY MOUNT

CROSS-REFERENCE TO RELATED APPLICATION

This application claims the benefit of, and priority to, U.S. Provisional Patent Application No. 63/151,008, filed on Feb. 18, 2021, entitled "RAIL ACCESSORY MOUNT," the content of which is hereby expressly incorporated by reference in its entirety.

BACKGROUND

Current rooftop solar arrays often consist of more than one row of solar modules. These rows of solar modules typically are electrically bonded with a copper wire connected using a fastening mechanism to each row of solar modules. This causes an excessive amount of wire to be used to electrically bond adjacent rows of solar modules.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Figure 1:
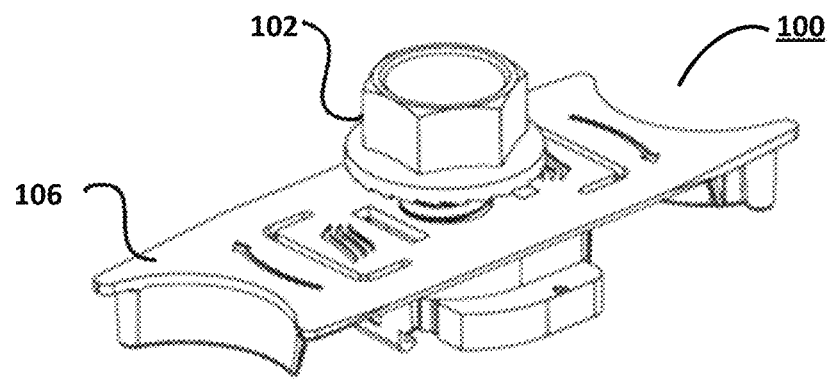
FIG. 1 illustrates an example according to an embodiment.
Figure 2:
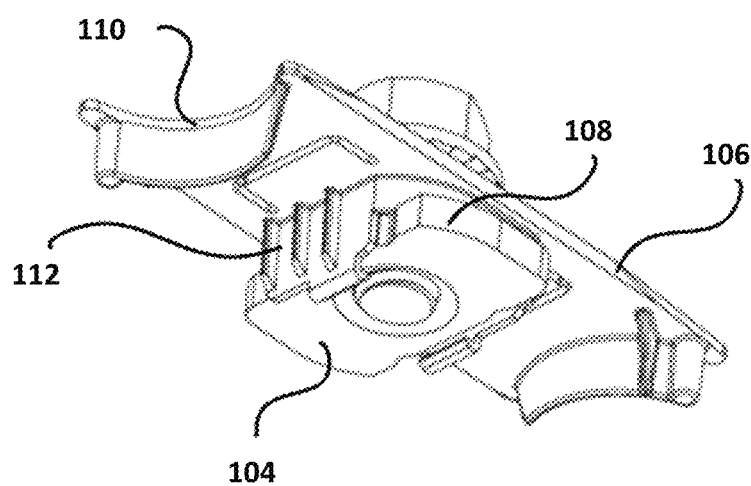
FIG. 2 illustrates an example according to an embodiment.

FIGS. 1 and 2 depict a Rail Accessory Mount 100 in an isometric view. The Rail Accessory Mount in the example embodiment is assembled from a fastener 102, a plate-nut 104, and a grip 106. The fastener 102 may be a hex flange fastener. The plate-nut 104 may have a centrally located threaded aperture through which the fastener threadably engages. The threaded aperture may have a cone extending up in order to provide sufficient threads that otherwise would not be if the plate-nut had no cone. The plate-nut 104 may have curved radii on opposite corners 108 to allow for turning of the plate-nut within a channel free of interference until the length of the plate-nut is substantially perpendicular to a channel. The plate-nut may have upwardly protruding ridges or pyramids to cut through an anodization layer of a rail to create an electrical bond path. A grip 106 may have a substantially flat top surface. The sides of the Grip may taper in towards the distal ends of the Grip, and may have a chamfer on the underside sides. The Grip may have inset curved cut-outs 110 at each distal end that may be asymmetric. A curved flange may extend down from each cut-out. An angled ramp may be located on one side of the curved flange, the ramp face generally tangent to the arc of a central aperture in the Grip. The Grip may have a semi-rectangular ring flange protruding down from the top surface with large radii on opposite corners. The long edges of the ring flange may extend below the main protrusion of the ring, with a locking tab at the distal end. A plurality of ribs may be disposed along the ring flange for added strength. The locking tabs 112 may grip the underside of the plate-nut to prevent it from falling out. Interior (not shown) to the ring flange may be one or more ribs that interact with the cone of the plate-nut to prevent the plate-nut from sliding laterally relative to the Grip. The Grip may be made of a plastic material, and may be formed using an injection molding process.

Figure 3:
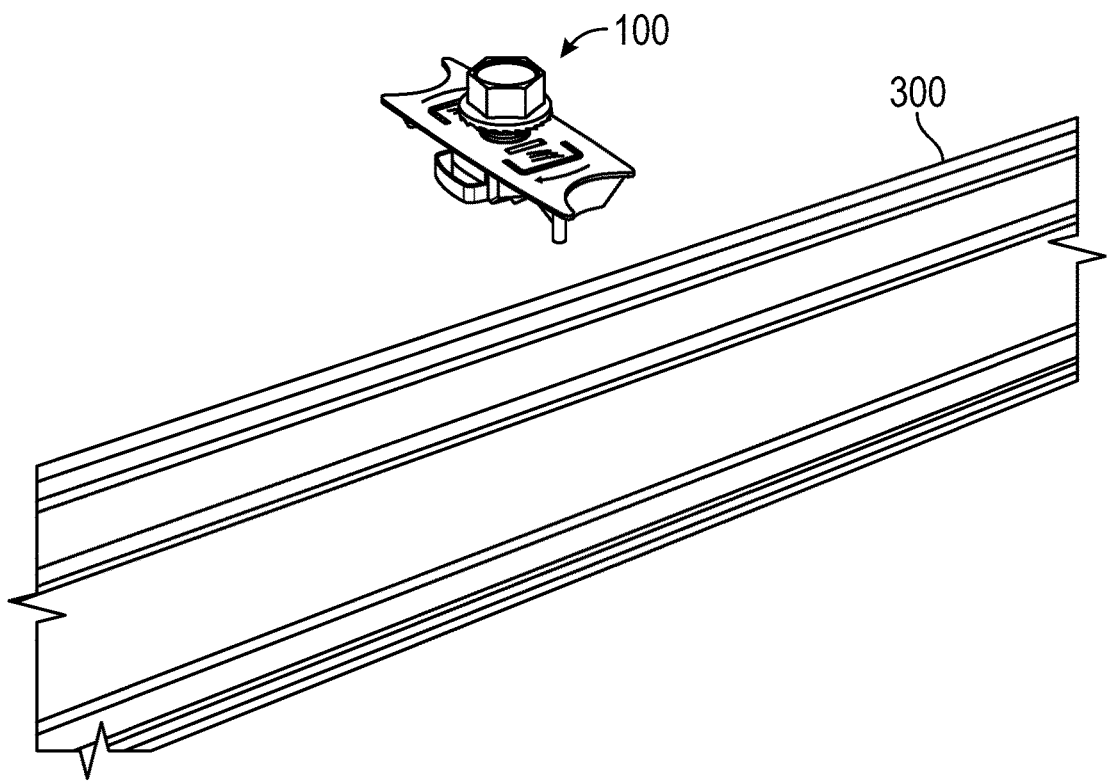
FIG. 3 illustrates an example according to an embodiment.
Figure 4:
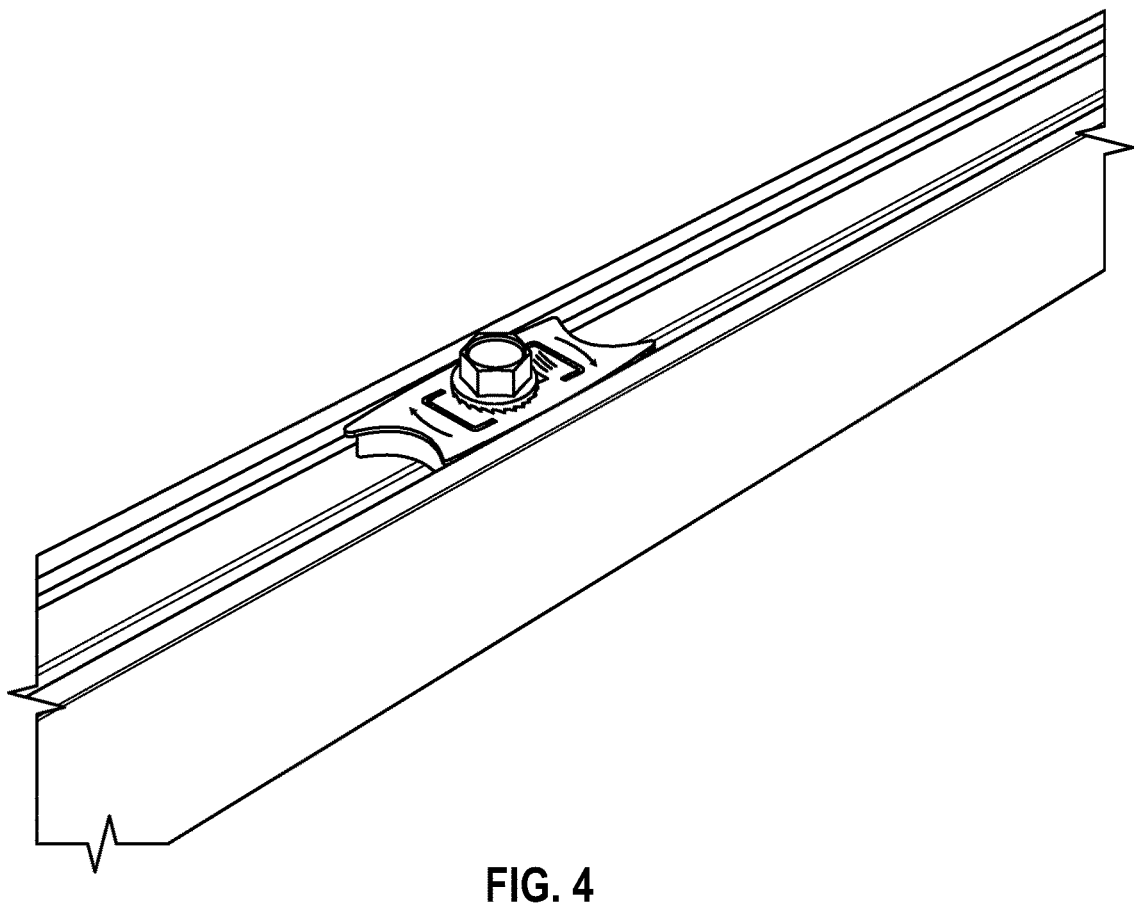
FIG. 4 illustrates an example according to an embodiment.

FIGS. 3 and 4 depict a Rail Accessory Mount 100 being installed into a Rail 300. In this example embodiment, the Rail Accessory Mount is substantially perpendicular to the rail, over a rail channel. The Rail Accessory Mount is placed on top of the rail and turned clock-wise so the plate-nut rotates underneath flanges of the rail. The Angled Ramps on either side of the Grip may interact with the outside edge of the rail to deform the distal ends of the Grip upwards thereby lifting the Curved Flanges above the edges of the rail. Upon transitioning to a parallel position relative to the rail, the Curved Flanges may spring back down into the opening of the rail, thus preventing the Rail Accessory Mount from substantially turning in either direction relative to the rail.

Figure 5:
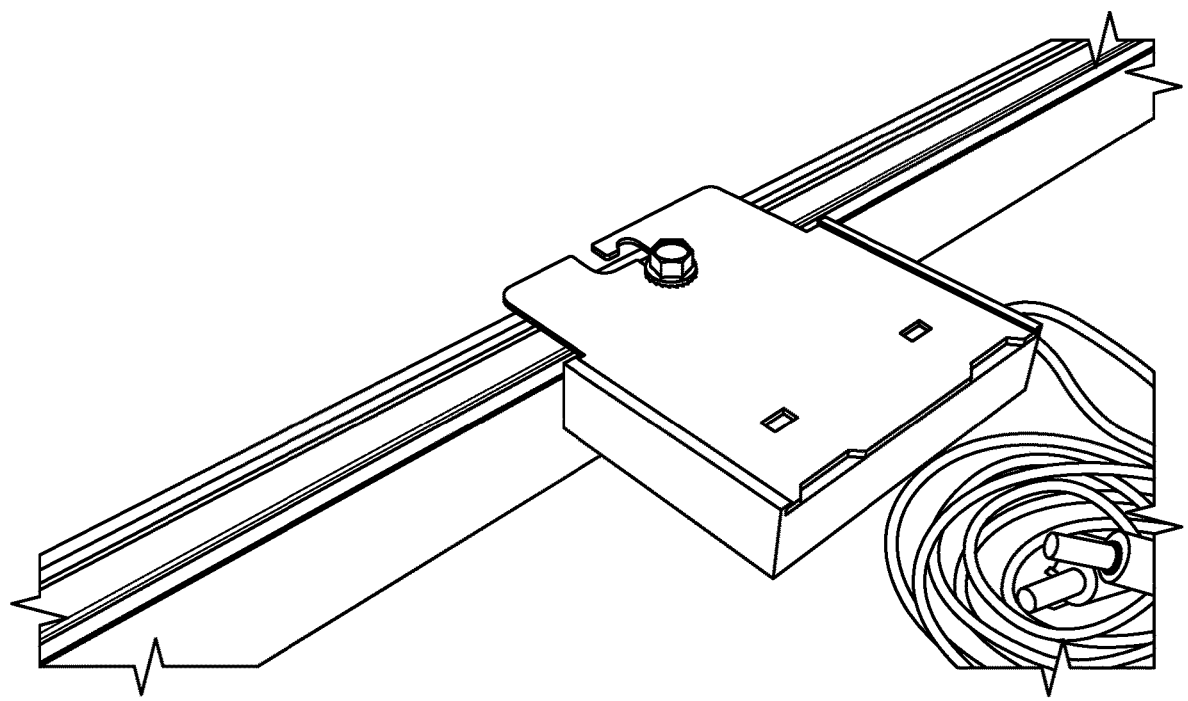
FIG. 5 illustrates an example according to an embodiment.

FIG. 5 shows a device installed onto the Rail Accessory Mount. The device may have a slot, which the fastener traverses through until the desired location is achieved. Then the fastener is tightened, securing the device to the rail. When the fastener is rotated, the threads engage the plate-nut, forcing the plate nut against the flanges of the Rail, securing the Rail Accessory Mount to the rail. When the fastener is rotated, the threads engage the plate-nut, forcing the plate nut against the flanges of the Rail, and the bond pyramids cut through the anodization in the rail flanges to create an electrical bond path. The electrical bond path may be from the rail to the device, via the plate-nut and fastener.

Figure 6:
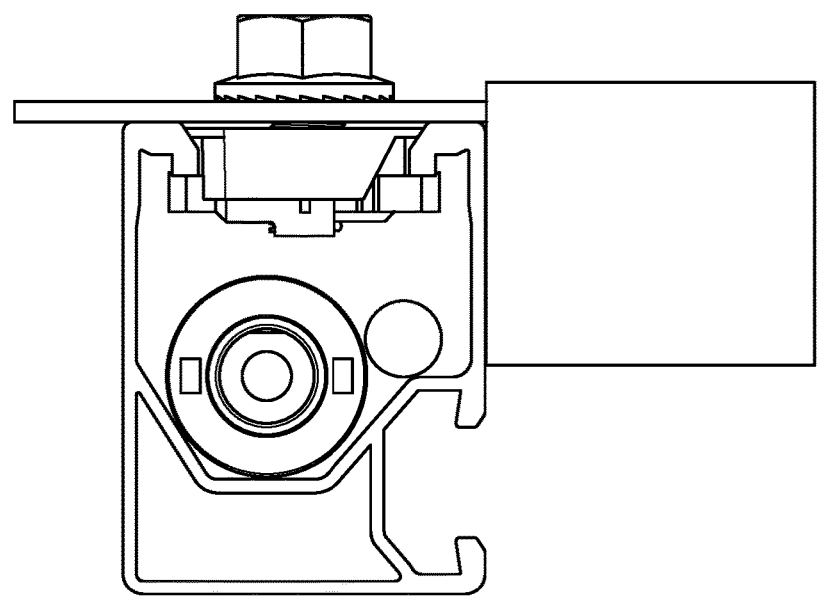
FIG. 6 illustrates an example according to an embodiment.

FIG. 6 depicts an end view of the Rail Accessory Mount attached to the rail. In this example embodiment, the plate nut is against the flanges of the Rail. An exemplary wire connector and wire are shown in the channel of the Rail, free from interference with the Rail Accessory Mount.

Figure 7:
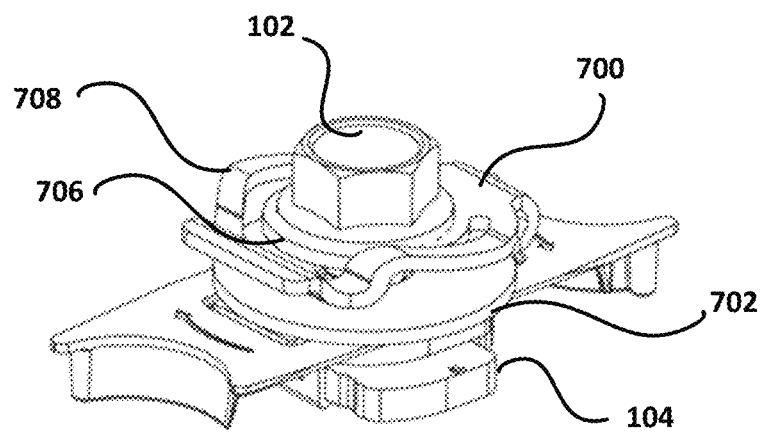
FIG. 7 illustrates an example according to an embodiment.
Figure 8:
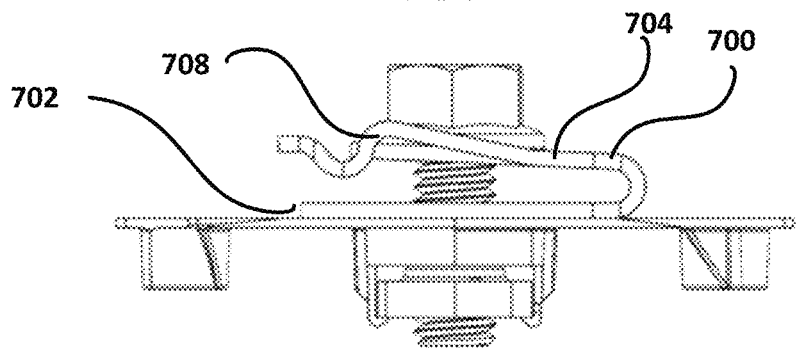
FIG. 8 illustrates an example according to an embodiment.
Figure 9:
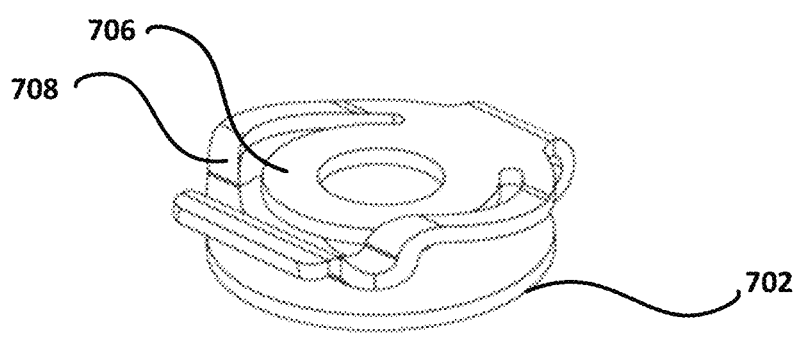
FIG. 9 illustrates an example according to an embodiment.

FIGS. 7, 8, and 9 depict the Rail Accessory Mount with a Ground Lug 700 installed. Ground Lug 700 is a u-shaped clamp. In FIGS. 7 and 8, the fastener 102 extends through the two central apertures of the Ground Lug 700 and into the plate-nut 104. The Ground Lug 700 may have a substantially circular flange or lower plate 702 with a substantially centered through-hole. An upper plate or flange 704 may consist of two bodies or portions, the first portion 706 being a circularly shaped flange with a substantially centrally located aperture, which may be over the first aperture to allow easy pass-through of the fastener. The second portion 708 of the upper body may be a spring function with an offset bend, where symmetric arms angle up away from the first plate, then sharply angle downwards to reconnect at a horizontal tab. The Ground Lug or u-shaped clamp 700 may be constructed of a stainless steel or aluminum material, and may be of a substantially uniform material, such as sheet metal. The ground lug may be formed on a progressive die stamping machine.

Figure 10:
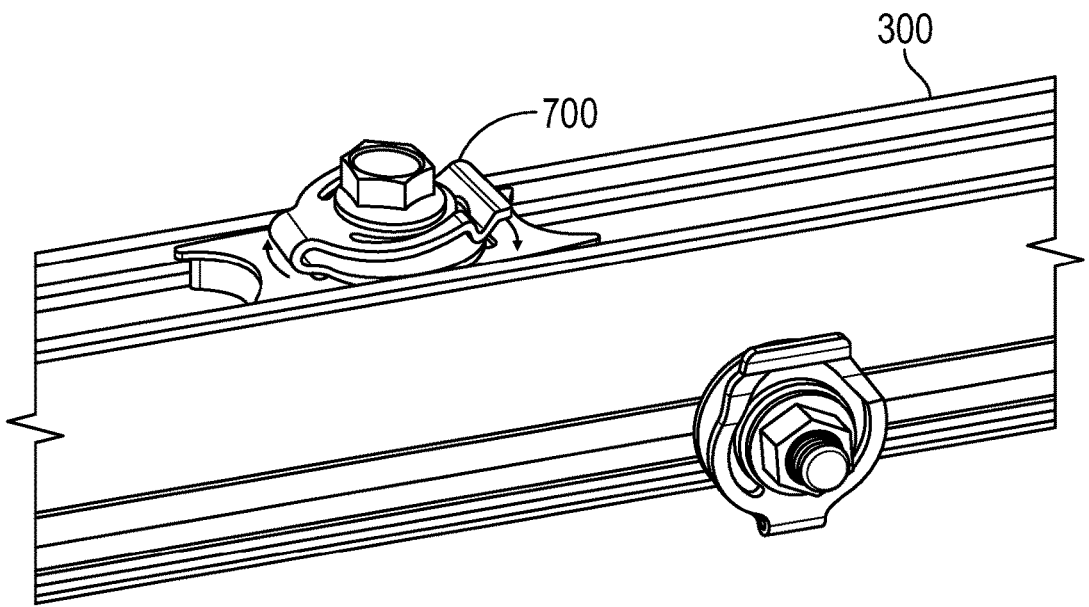
FIG. 10 illustrates an example according to an embodiment.
Figure 11:
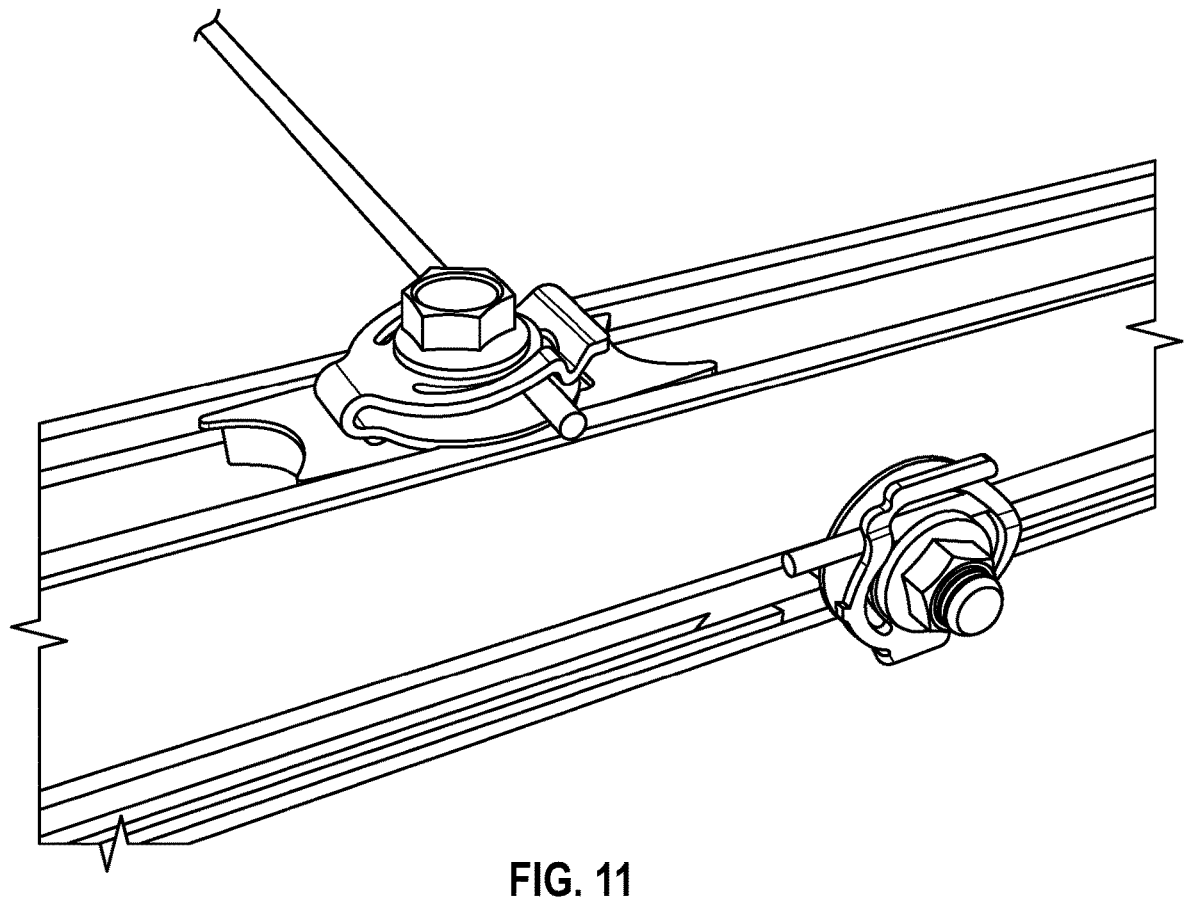
FIG. 11 illustrates an example according to an embodiment.

FIGS. 10 and 11 show two example embodiments of the Ground Lug or u-shaped clamp 700 installed onto a Rail 300. The first example is the Ground Lug installed on a Rail Accessory Mount disposed in the main channel of the Rail. The second example shows the ground lug installed using a fastener disposed into a side channel of the Rail. The first plate of the Ground Lug may have a diameter to extend beyond the opening of the main channel of the Rail. FIG. 11 depicts an example set of wires connected into the Ground Lug. The Spring section of the Ground Lug may allow different size wires to engage into the ground lug and up against the fastener with some force applied, i.e. hand force. Once the wire is engaged into the Ground Lug, the bend in the spring may prevent wire from readily traversing laterally out of the ground lug—i.e. orthogonal to its length. After a wire is engaged into the Ground Lug, the fastener may be tightened, forcing the inner top plate of the ground lug down to squeeze the wire against the lower plate of the Ground Lug. In this configuration, the wire is substantially tangent to the fastener, and held between the two flanges.

Figure 12:
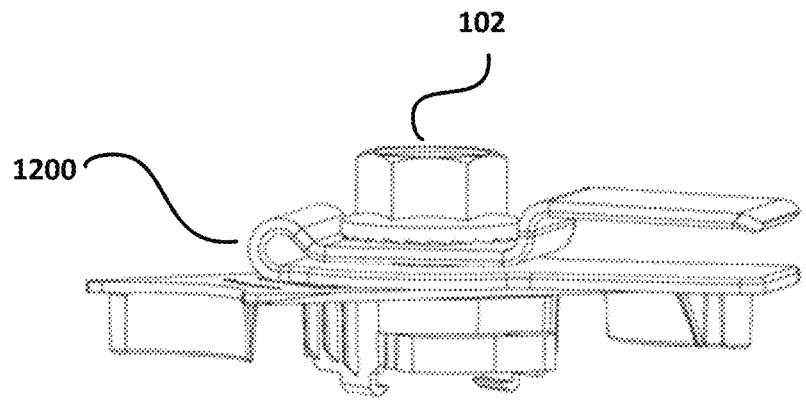
FIG. 12 illustrates an example according to an embodiment.
Figure 13:
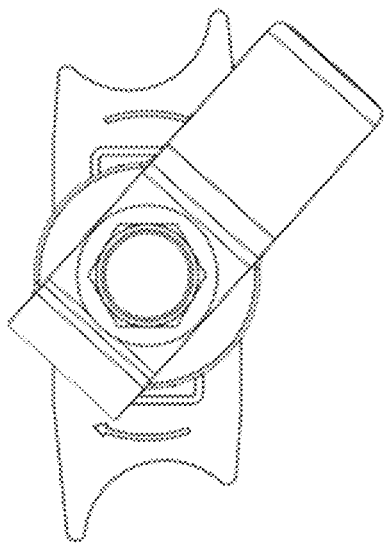
FIG. 13 illustrates an example according to an embodiment.

FIGS. 12 and 13 show a Cable Grip 1200 installed onto a Rail Accessory Mount. The Cable Grip 1200 is also a u-shaped clamp, and may have a first substantially flat plate or flange with a distal end and a the u-shaped bend at a second distal end. The u-shaped bend connects the lower flange and upper flange, and may form into a top plate of the Cable Grip, then a jog up with an offset bend to an upper flange that extends substantially to be coincident with the first distal end of the first plate or flange. A pair of apertures may be disposed through the Cable Grip in the second plate and first plate to allow a fastener 102 to pass through freely. The second flange may be substantially parallel with the first flange, and may be offset a small amount, such as 1 millimeter. The flange may be offset from the first plate a distance of a standard cable used in solar photovoltaic installations. The flange may be parallel or at a downward angle relative to the first plate. Upon threadably engaging the fastener, the second plate of the flange may be compressed down onto one or more PV cables. The cable grip may be formed of a stainless steel or aluminum material, and may be of a substantially uniform thickness, such as sheet metal. The Cable Grip or u-shaped clamp 1200 may be formed using a progressive die.

Figure 14:
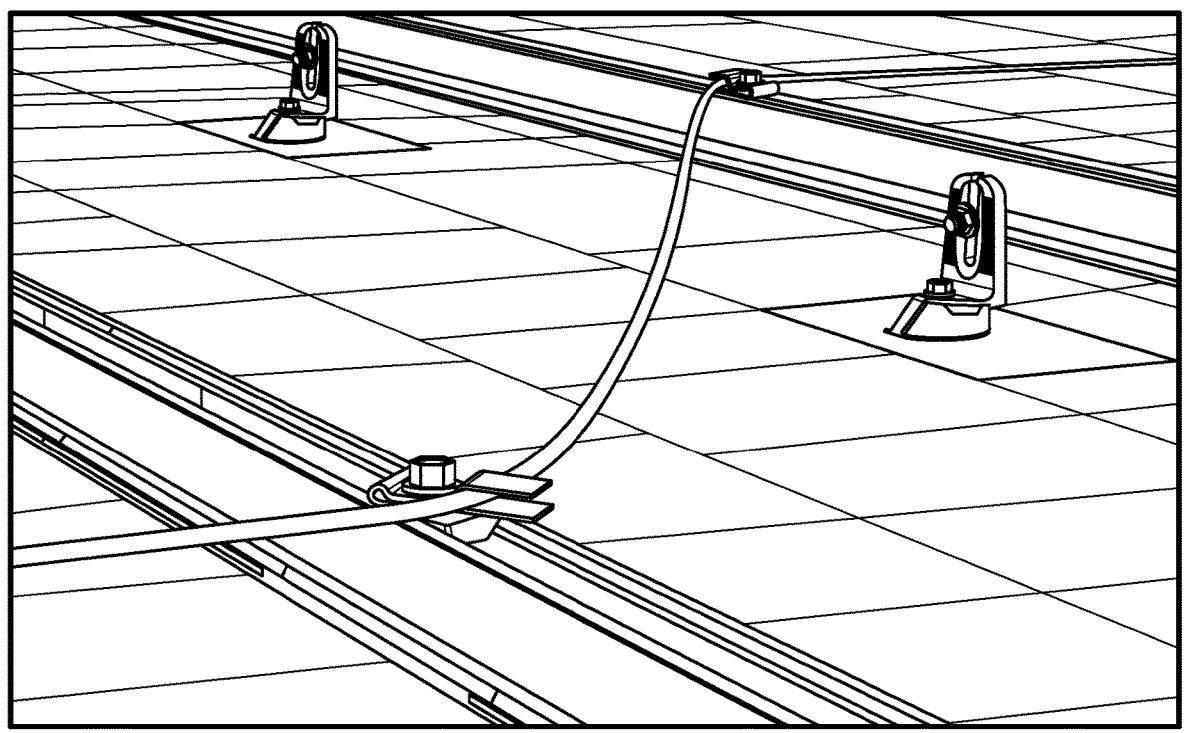
FIG. 14 illustrates an example according to an embodiment.

FIG. 14 depicts an example use of the Cable Grip 1200, wherein the two Cable Grips are installed on two Rail Accessory Mounts on two rails disposed on a roof surface. A PV cable is routed through the flange and first plate of both Cable Grips, and both fasteners are tightened to substantially prevent the cable from sliding. The pyramids on the plate-nut also prevent the Rail Accessory Mount from sliding laterally in the rail once the fastener has been tightened to a device, ground lug, or Cable Grip.

What is claimed is:

1. A u-shaped clamp, comprising:
    a substantially planar first flange, the first flange having a first aperture; and
    a second flange, the second flange having a second aperture, wherein the first aperture and the second aperture are configured to allow a fastener to pass through both apertures, wherein the first flange and the second flange connect to each other with a u-shaped bend, the second flange having a substantially planar first portion that surrounds the second aperture, and an second portion having an offset bend, the offset bend on the second portion being opposite the u-shaped bend with respect to the second aperture, the offset bend configured to receive an inserted wire, cable, or pipe in a solar array, and wherein one or more of the flanges is configured to form an electrical bonding connection with the inserted wire, cable, or pipe when the fastener is tightened.

2. The u-shaped clamp of claim 1, wherein the offset bend on the second portion is offset toward the first flange.

3. The u-shaped clamp of claim 2, wherein the offset bend on the second flange is further configured to hold the inserted wire, cable, or pipe substantially tangent to the fastener, when the fastener has been passed through the first and second apertures.

4. The u-shaped clamp of claim 2, wherein the offset bend on the second flange has a terminal portion bent away from the first flange, the bending of the terminal portion configured to facilitate insertion of the wire between the first flange and the second flange.

5. The u-shaped clamp of claim 2, wherein the offset bend provides a spring action to retain the inserted wire between the second flange and the first flange before the fastener is tightened.

6. The u-shaped clamp of claim 2, wherein the first flange and the second flange are brought together when the fastener is tightened, and wherein the substantially planar first flange and the substantially planar first portion of the second flange clamps the inserted wire, cable, or pipe therebetween when the fastener is tightened.

7. The u-shaped clamp of claim 1, wherein the offset bend on the second portion is offset away from the first flange.

8. The u-shaped clamp of claim 7, wherein the offset bend on the second flange has a terminal portion bent toward the first flange, the bending of the terminal portion configured to hold the inserted wire, cable, or pipe between the first flange and the second flange before the fastener is tightened.

9. The u-shaped clamp of claim 1, wherein an outer perimeter of the substantially planar first flange is substantially circular.

10. The u-shaped clamp of claim 1, wherein a diameter of the second aperture is greater than a diameter of the first aperture.

11. The u-shaped clamp of claim 1, wherein the clamp is formed from a substantially uniform thickness metal.

12. The u-shaped clamp of claim 1, wherein the clamp is stainless steel or aluminum.

13. The u-shaped clamp of claim 1, wherein the electrical bonding connection is formed between the clamp, the inserted wire, cable, or pipe, and the fastener.

14. A method of installing a wire, cable, or pipe into the u-shaped clamp of claim 1, the method comprising:
- inserting the wire, cable, or pipe into a space between the first flange and the second flange; and
- threadably tightening the fastener, causing the inserted wire, cable, or pipe to be clamped between the first flange and the second flange.

15. A clamp system for a solar panel array, comprising:
- a threaded fastener;
- a threaded nut cooperating with the threaded fastener, and
- a u-shaped clamp, the u-shaped clamp comprising:
  - a substantially planar first flange, the first flange having a first aperture; and
  - a second flange, the second flange having a second aperture, wherein the first aperture and the second aperture are configured to allow the fastener to pass through both apertures, wherein the first flange and the second flange connect to each other with a u-shaped bend, the second flange having a substantially planar first portion that surrounds the second aperture, and an second portion having an offset bend, the offset bend on the second portion being opposite the u-shaped bend with respect to the second aperture, the offset bend configured to receive an inserted wire, cable, or pipe in a solar array, and wherein one or more of the flanges is configured to form an electrical bonding connection with the inserted wire, cable, or pipe when the fastener is tightened within the apertures.

\* \* \* \* \*